United States Patent [19]

Salin

[11] Patent Number: 5,625,671
[45] Date of Patent: Apr. 29, 1997

[54] METHOD OF CHECKING THE IDENTITY OF A SUBSCRIBER EQUIPMENT

[75] Inventor: Hannu-Pekka Salin, Vantaa, Finland

[73] Assignee: Nokia Telecommunications Oy, Espoo, Finland

[21] Appl. No.: 446,842
[22] PCT Filed: Dec. 1, 1993
[86] PCT No.: PCT/FI93/00515
   § 371 Date: Jun. 1, 1995
   § 102(e) Date: Jun. 1, 1995
[87] PCT Pub. No.: WO94/13115
   PCT Pub. Date: Jun. 9, 1994

[30] Foreign Application Priority Data

Dec. 1, 1992 [FI] Finland .................. 925470

[51] Int. Cl.⁶ .................................................. H04M 11/00
[52] U.S. Cl. ................... 379/58; 379/59; 379/60; 379/63
[58] Field of Search ........................ 455/33.1, 31.1; 379/59, 58, 60, 63

[56] References Cited

U.S. PATENT DOCUMENTS

| | | | |
|---|---|---|---|
| 5,329,573 | 7/1994 | Chang et al. | 379/58 |
| 5,396,543 | 3/1995 | Beeson | 379/59 |

FOREIGN PATENT DOCUMENTS 0463384  1/1992  France .

OTHER PUBLICATIONS

FITCE Journal (belgium), No. 4, Oct.–Dec. 1991, pp. 33–36, M Loix, "The Equipment Identity Register (EIR)"; see p. 33, column 1, lines 1–16; p. 34, column 1, line 9–column 2, line 42; p. 35, column 2, line 15–page 36, column 1, line 13; see especially p. 35, column 2, lines 28–33.

Recommendation GSM 02.16 ("International MS Equipment Identities"), version 3.0.1., 1992 ETSI; see chapter 4, Administrative Use of IMEI (pp. 3–4).

CME 20 System Training Document, Ericsson Radio Systems AB, 1991; see chapter 10 ("Switching system — HLR/AUC, security aspects"), pp. 10:20–10:21 (Equipment identification).

Electrical Communication (France), No. 2, 1993 (2nd. Quarter), pp. 141–154–, M. Feldmann et al., "GSM Network Systems and Overall System Integration" see p. 142, column 1, line 17— column 2, line 17; p. 151, column 3, line 6–page 152, column 1, line 22.

Recommendation GSM 09.02, version 3.8.0, pp. 16, 17.

Primary Examiner—Dwayne D. Bost
Assistant Examiner—Scott Richardson
Attorney, Agent, or Firm—Cushman, Darby & Cushman IP Group of Pillsbury Madison & Sutro LLP

[57] ABSTRACT

A method of checking a subscriber equipment identity in a subscriber equipment identity register and a mobile telephone exchange, in connection with which there is a subscriber Equipment Identity register, which comprises lists containing subscriber equipment identities, which lists have list identities. In order that desired short messages may be transmitted to subscribers, responsive to an occurrence of a subscriber equipment on one of the lists, the mobile telephone exchange includes a memory for storing an operation instruction corresponding to at least one list identity, a short message generator for generating a short message according to the stored operation instruction and for transmitting the generated short message to the subscriber.

3 Claims, 2 Drawing Sheets

| LIST IDENTITY | OPERATION |
|---|---|
| YELLOW | |
| RED | |
| GREEN | |
| BLUE | |

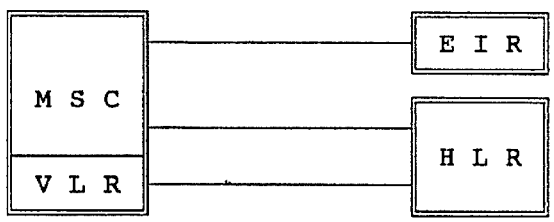
FIG. 1
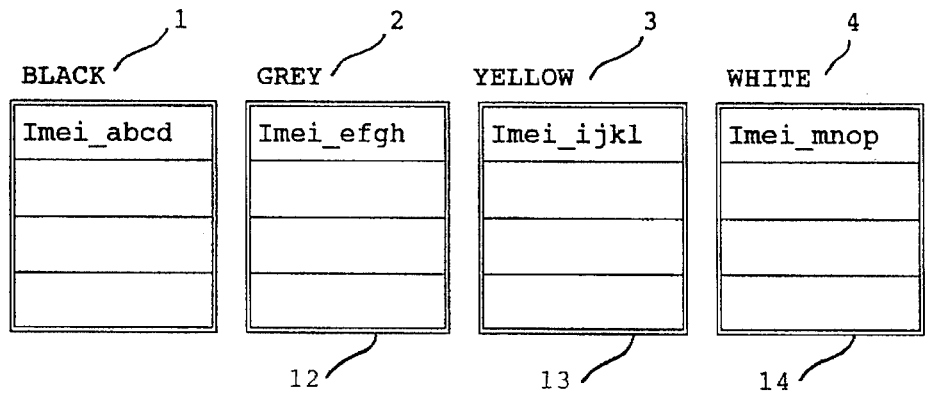
FIG. 6
FIG. 2
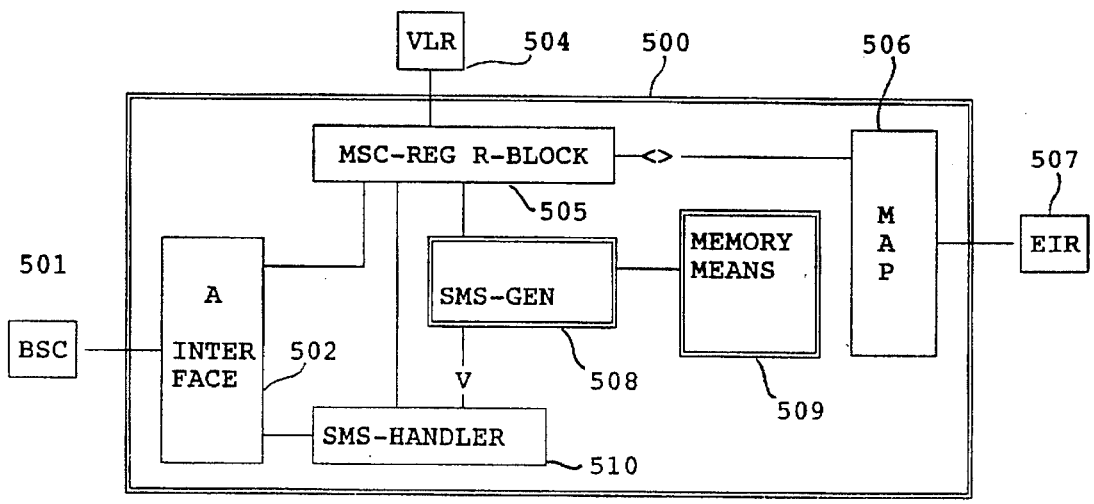
FIG. 5

METHOD OF CHECKING THE IDENTITY OF A SUBSCRIBER EQUIPMENT

BACKGROUND OF THE INVENTION

The invention relates to a method of checking a subscriber equipment identity in a subscriber equipment identity register of a mobile telephone exchange, which comprises an interface block, by means of which the mobile telephone exchange is connected to the subscriber equipment identity register arranged in connection with the mobile telephone exchange, which subscriber equipment identity register comprises lists containing subscriber equipment identities, which lists have list identities, in which method the mobile telephone exchange requests the subscriber for the subscriber equipment identity, the subscriber sends its equipment identity to the mobile telephone exchange, the mobile telephone exchange sends said subscriber equipment identity to the subscriber equipment identity register, the subscriber equipment identity register searches for the subscriber equipment identity corresponding to said subscriber equipment identity in the lists and sends the list identity of that list in which said subscriber equipment identity is found to the mobile telephone exchange and the mobile telephone exchange performs a predetermined function corresponding to the list identity.

The invention relates further to a mobile telephone exchange, in connection with which there is a subscriber equipment identity register, which comprises lists containing subscriber equipment identities, which lists have list identities.

It is known from mobile telephone systems that a mobile telephone subscriber has an identity, by which a subscriber equipment may be identified and from which appears the manufacturer of the subscriber equipment, for instance. Mobile telephone networks comprise a function, in which the subscriber equipment identity, which is in a GSM system the International Mobile Equipment Identity IMEI of the subscriber, is checked by asking the subscriber for its equipment identity. The checking is made, for example, because of a desire of ensuring that it is permitted to use this subscriber equipment in the network or, in other words, that the subscriber equipment is not stolen or marked faulty, which means that using it does not cause any interference in the network. A detailed composition of a subscriber equipment identity according to a GSM system is presented in standard GSM 03.03, Numbering, Addressing and Identification, Version 3.5.0, January 1991, ETSI. The subscriber may be requested for the subscriber equipment identity, for instance, typically each time when the subscriber equipment has established a connection with the mobile telephone exchange. One procedure for requesting for a subscriber equipment identity is set forth in GSM standard 09.02, Mobile Application Part Specification, Version 3.8.0, January 1991, ETSI, Paragraph 5.9.1, FIG. 5.9.1. The same paragraph of the same publication also presents how the subscriber equipment identity is subsequently sent to an Equipment Identity Register EIR, the connection of which to the mobile telephone exchange over an interface F is described in Paragraph 5.1 of the same standard, especially in FIG. 5.1.1.

The Equipment Identity Register EIR or some other location in the mobile telephone network comprises lists, e.g., according to the standard GSM 02.16, International MS Equipment Identities, Version 3.0.1, 1992, ETSI, which lists contain subscriber equipment identities or series of subscriber equipment identities and have list identities. The list identities used in the standard are composed of colours, which naturally indicate numerical identities, for instance. White color or identity is the identity of a list composed of all number series containing the equipment identities allocated by operators using the same mobile telephone system, here a GSM system, to the subscriber equipments permitted to be used in the networks. These number series are presented by informing beginning and end numbers of the series only, i.e. not by listing identities of individual subscriber equipments. A list marked with black color, i.e. black list identity, contains the identities of all subscriber equipments which shall be barred from using a mobile telephone network and a mobile telephone, e.g. because the subscriber equipment in question is faulty and could cause interference in the actual mobile telephone system or because the subscriber equipment is stolen. With gray color, i.e. gray list identity, may be marked a list containing the identities of the subscriber equipments the operation of which shall be monitored in the mobile telephone network, i.e. the identities of the equipments which may be faulty and may cause, e.g., interference in or unnecessary load on the mobile telephone network. On the gray list may also be put such new equipments the operation of which shall be monitored, because there is no guarantee yet that they operate free of interference. In a prior art solution, the equipment identities and International Mobile Subscriber Identifications IMSI of such faulty subscriber equipments are supposed to be reported to an Operation and Maintenance Center OMC of the mobile network. After having received the report, the staff of the OMC judges whether the subscriber in question may continue using the mobile network or whether the mobile telephone shall be denied a right to use the mobile network, i.e. whether the equipment identity of this subscriber shall be put on the black list. The operation staff may also find out the MSISDN number of the subscriber, which is the international ISDN (Integrated Services Digital Network) number of the Mobile Station, and call the subscriber and inform orally that the equipment of the subscriber is faulty or that the equipment shall be sent to maintenance.

A procedure as described above in a situation in which a subscriber equipment is, for instance; faulty and its identity has been put on the gray list is rather cumbersome for the staff of the OMC of the mobile network operator. The fact is that if a subscriber equipment identity has been put on the gray list and it is checked for instance in the lists contained in the EIR and the EIR detects that the subscriber equipment actually is on the gray list and transmits an information of the subscriber being on the gray list and of the subscriber equipment identity being checked to the OMC, then the staff of the OMC shall search for the MSISDN number of the subscriber manually and call the mobile telephone of this subscriber. Such a procedure is cumbersome, of course, and requires a large staff. Additionally, the procedure described cannot be expanded to concern informing of regular maintenances of mobile telephones attended to by mobile telephone manufacturers or transmitting another similar conditional information to mobile telephone subscribers desired. This problem is accentuated if the operator wishes to send a message to several mobile telephones in its service area.

SUMMARY OF THE INVENTION

The object of the present invention is to make it possible to send various messages automatically to subscribers listed on a certain list of the Equipment Identity Register EIR of a mobile network, the equipment identity of which subscribers is checked in the EIR.

This novel method of checking a subscriber equipment identity in the EIR is achieved by an arrangement according to the invention, which arrangement is characterized in that, responsive to at least one list identity, a predetermined short message is generated and sent to the subscriber.

This novel mobile telephone exchange is characterized in that it comprises: a memory means for storing an operation instruction corresponding to at least one list identity, a short message generator for generating a short message according to that operation instruction and for transmitting the generated short message to the subscriber.

The invention is based on the idea of giving the operator a possibility of creating a new subscriber equipment list in the subscriber Equipment Identity Register EIR. When the system checks in the EIR a subscriber equipment identity listed on this new subscriber equipment list and sends the identity of this list to the mobile telephone exchange, the mobile telephone exchange or some other entity reads into the memory means an operation instruction corresponding to that list identity. According to the operation instruction, a short message with desired content is generated and then sent to a desired subscriber, typically to the subscriber the equipment identity of which was checked in the EIR.

An advantage of such a method of checking a subscriber equipment identity in the EIR and of such a mobile telephone exchange is that the invention makes it possible to send a short message, as desired, automatically to the subscriber equipments listed in advance on the lists of the EIR. For sending desired short messages or speech messages according to the invention, no operator staff is required in the Operation and Maintenance Centre OMC of the mobile network, but the mobile telephone exchange attends automatically to the transmission of information, i.e. short messages, to the subscribers the equipment identities of which have been put in advance on a subscriber equipment list desired.

A further advantage of the method and the mobile telephone exchange according to the invention is that if a message shall be sent to a subscriber or a subscriber equipment, it is not necessary to know the directory number of the subscriber, i.e. the MSISDN number or the Mobile Station international PSTN(Public Switched Telephone Network)/ISDN number of the subscriber, being the international ISDN number of the mobile telephone, but it is enough to know the subscriber equipment identity given by the manufacturer of the mobile telephone. This property is especially usable when the manufacturer of the mobile telephone wishes to send a message to all subscribers which have an equipment produced by this manufacturer. Such a message could be for example an information of the subscriber equipment needing regular maintenance or some commercial information.

BRIEF DESCRIPTION OF THE DRAWINGS

In the following, the invention will be explained in more detail referring to the attached drawings, in which:

FIG. 1 shows a block diagram of a mobile telephone exchange and a subscriber equipment identity register relating thereto, FIG. 2 shows list identities of subscriber equipment lists contained in the subscriber equipment identity register and a memory hierarchy of the subscriber equipment lists, FIG. 5 shows a block diagram of the mobile telephone exchange according to the invention, and FIG. 6 shows a memory hierarchy of a memory means according to the invention with respective pairs of list identities and operations.

DETAILED DESCRIPTION

Figure 3:
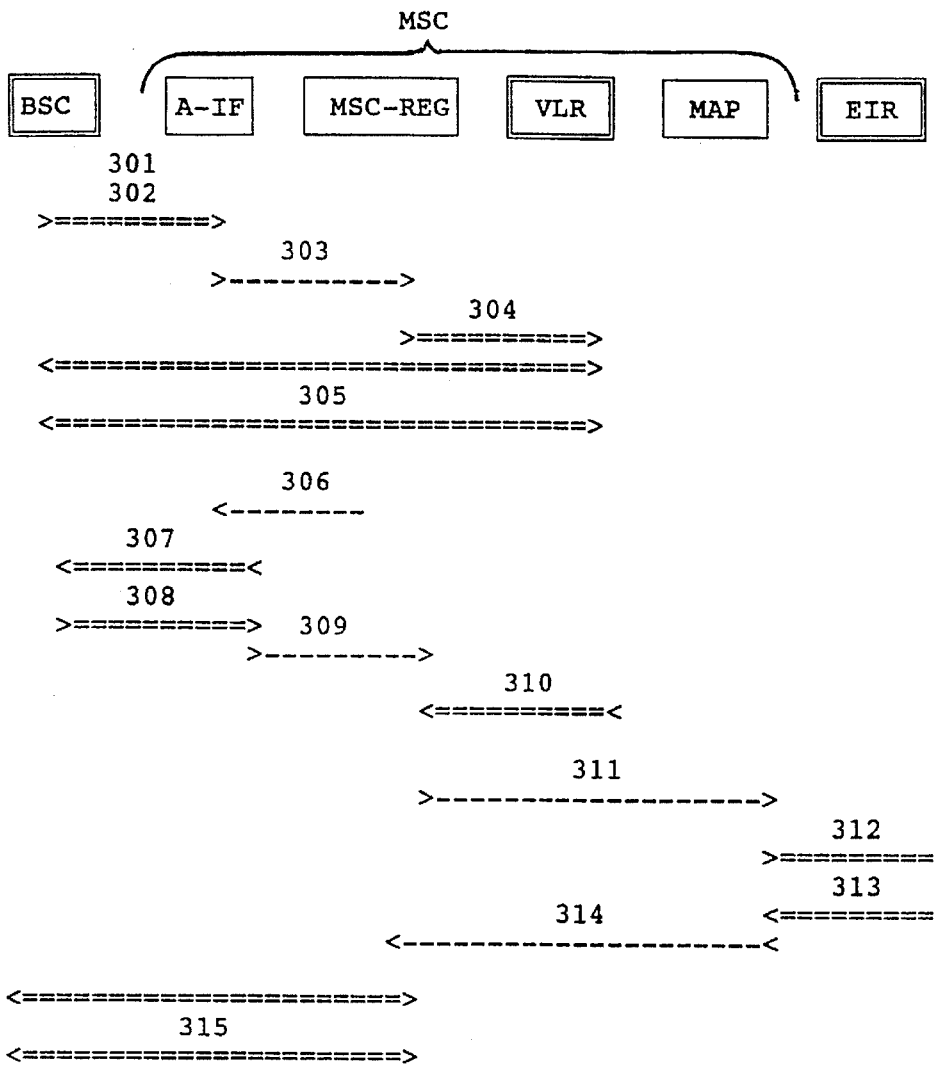
FIG. 3 shows a signalling diagram of the operation of a mobile telephone exchange and a subscriber equipment identity register according to the invention.

FIG. 1 shows a mobile telephone or mobile station exchange MSC to be used in a mobile telephone network, e.g. in a GSM network (GSM=Global System for Mobile Communications), to which exchange are connected a Visitor Location Register VLR and a Home Location Register HLR of the mobile telephone exchange. The HLR may also be implemented elsewhere than in the immediate vicinity of the mobile telephone exchange. To the MSC is additionally connected a subscriber Equipment Identity Register EIR containing subscriber equipment lists provided with list identities, which lists are illustrated in more detail in FIG. 2. The MSC may request a subscriber equipment for its Equipment Identity IMEI each time when the subscriber equipment has established a connection with the MSC. Then, the MSC may check the legality of the IMEI in the EIR by sending the IMEI of the subscriber to the EIR, which checks the legality of the subscriber in a manner to be described later. The result of this checking, i.e. the identity of the list on which the respective subscriber exists, is returned from the EIR to the MSC, which will take the necessary measures.

FIG. 2 shows a memory hierarchy of subscriber equipment lists 11, 12, 13, 14 contained in the EIR (FIG. 1) and marked with list identities 1, 2, 3, 4. In addition to the identities 1, 2, 3, 4, each list 11, 12, 13, 14 contains subscriber equipment identities IMEI belonging to each list, which IMEIs are indicated here by references Imei_abcd, Imei_efgh. A black list is shown in FIG. 2. Subscriber equipments corresponding to subscriber equipment identities Imei_abcd on that list are barred if they establish a connection with the mobile network. Subscriber equipments corresponding to subscriber equipment identities Imei_efgh on a gray list are subjected to monitoring as follows. When they establish a connection with the mobile network, an information of this connection goes to an Operation and Maintenance Center OMC of a mobile network operator, the operation and maintenance staff of which center decides whether this subscriber is permitted to utilize the services of the mobile network further. A white list comprises all number series containing the subscriber equipment identities which have been allocated by the operators using the same mobile telephone system to the subscriber equipments which are permitted to be used in the respective said network. Accordingly, these are the subscriber equipment identities of all those subscriber equipments which are permitted to be used in the area of this mobile network. The MSC sends the IMEI of a subscriber to be connected to the mobile telephone network to the EIR and asks thus the EIR to send the identity 1, 2, 3, 4 of that subscriber equipment list on which the respective subscriber exists to the MSC. After having received the list identity, the MSC performs a predetermined function corresponding to the list identity, which means, e.g., in connection with the black list that the MSC prevents the subscriber from utilizing the services of the mobile network. In connection with the gray list, the MSC takes predetermined measures for checking the condition of the subscriber equipment concerned and prevents this subscriber equipment from utilizing the services of the mobile network. In addition to the previous lists, FIG. 2 shows a yellow list, which is needed for the implementation of the method and mobile telephone exchange of the present invention. If the subscriber equipment identity Imei_ijkl is on the yellow list and the MSC sends the IMEI of the subscriber to the EIR for checking, the EIR returns this IMEI and the identity of the yellow list to the MSC. An operation instruction corresponding to this list identity is then searched for in a memory means of the MSC and a short message corresponding to the operation instruction is generated and the generated short message is sent to the respective subscriber.

FIG. 3 shows a signalling diagram of the operation of a mobile telephone exchange MSC and a subscriber Equipment Identity Register EIR according to the invention. One of the Base Station Controllers BSC or base stations connected to the MSC sends a message 302 to the MSC, by which message a subscriber requests for permission to be connected to the exchange of a mobile telephone network, meaning that the subscriber asks for resources of some mobile network to be placed at his or her disposal, or a message 301, by which the subscriber responds to a subscriber paging. An interface A of the MSC, i.e. A-IF, receives these messages and sends a ProcessAccessRequest message 303 to an MSC-REG R-BLOCK of the MSC, by which message is requested for a right to be connected to the mobile network, i.e. a right to use the resources of the MSC for the benefit of the subscriber concerned. Then, a similar ProcessAccessRequest message 304 is transmitted to a Visitor Location Register VLR in connection with the MSC, which VLR authenticates the subscriber by requesting the subscriber for necessary authentication information 305 and by receiving the subscriber's response to this request. After this the MSC register interface block MSC-REG R-BLOCK sends a Provide IMEI message 306 to the A-IF, i.e. a request for the subscriber equipment identity and by this message the A-IF is requested to send an IMEI REQUEST message 307 to the subscriber and by this message again the subscriber is requested to send its subscriber equipment identity, i.e. IMEI. The subscriber responds by sending an IMEI Response message 308 including its IMEI to the A-IF. The A-IF transmits the IMEI of the subscriber to the MSC-REG R-BLOCK by a message 309 containing this IMEI. At this stage, a possible positive acknowledgement 310 of the ProcessAccessRequest message 304 may be received from the VLR. After having received the IMEI of the subscriber, the MSC-REG R-BLOCK sends over a Mobile Application Part MAP a CHECK IMEI message 311, which is sent further by the MAP as a CHECK IMEI message 312 to the EIR. The EIR responds to this by sending an acknowledgement message 313 containing the subscriber equipment identity and the identity of that subscriber equipment list on which this subscriber is put in the EIR. The MAP transmits 314 this information further to the MSC-REG R-BLOCK. When the identity of the subscriber equipment list comes to the MSC-REG R-BLOCK, the MSC-REG R-BLOCK starts a novel short message generator SMS-Gen by sending the IMSI of the subscriber and the identity of the subscriber equipment list received from the EIR to this generator. This will be described in more detail in connection with the explanation of FIG. 4.

Figure 4:
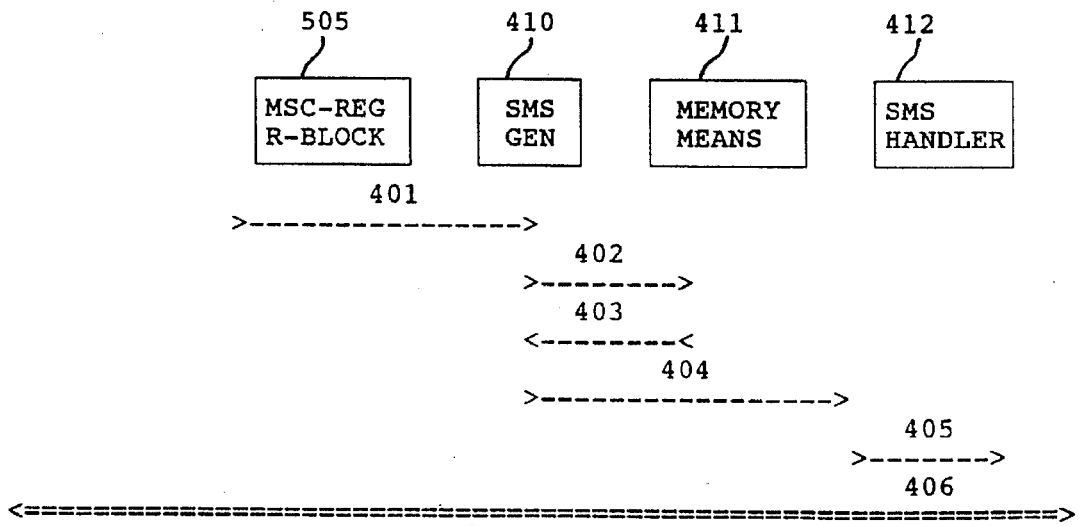
FIG. 4 shows another signalling diagram of the operation of the mobile telephone exchange and the subscriber equipment identity register according to the invention.

FIG. 4 shows a signalling diagram according to the invention, in which diagram the MSC-REG R-BLOCK sends the identity of that subscriber equipment list on which the equipment in question exists in the EIR and the IMSI of this subscriber by a message 401 to a short message generator 410 according to the invention, contained in the MSC, for instance. The short message generator 410, i.e. the SMS-Gen, searches in a memory means 411 by the aid of a message 402 containing the identity of the respective subscriber equipment list for an operation instruction corresponding to the identity of the subscriber equipment list and stored in advance in the memory means. A memory hierarchy of the memory means 411 is illustrated in connection with the explanation of FIG. 6. The memory means 411 returns the operation instruction by sending a message 403 to the SMS-Gen generating a short message corresponding to the operation instruction. The SMS-Gen 410 sends the generated short message to a short message handler 412 according to the prior art, which handler sends the short message over the interface A of the MSC further to the subscriber.

FIG. 5 shows a block diagram of a mobile telephone exchange MSC 500 according to the invention. A Base Station Controller BSC 501 is connected to the MSC 500 over an interface A 502. Messages from the BSC 501 are transmitted to an MSC-REG R-BLOCK 505, which takes necessary measures. To the MSC-REG R-BLOCK 505 is connected a Visitor Location Register VLR 504 outside the MSC or alternatively in the MSC. To the MSC-REG R-BLOCK 505 is connected a Mobile Application Part MAP 506 of the MSC, which MAP transmits according to the invention a CHECK IMEI request to an Equipment Identity Register EIR 507. The EIR 507 responds to the CHECK request by sending in the manner shown in FIG. 3 an acknowledgement message of the CHECK request, containing the identity of that subscriber equipment list to which this subscriber belongs, to the MAP. The MAP 506 transmits the list identity to the MSC-REG R-BLOCK, which sends this list identity and the IMEI of the subscriber further to a novel short message generator SMS-Gen 508 relating to the MSC-REG R-BLOCK. To the SMS-Gen 508 is also connected a memory means 509 according to the invention, in which are stored operation instructions corresponding to the list identities searched for in the EIR and corresponding to the IMEI. A memory hierarchy of the memory means 509 is illustrated in more detail in connection with the explanation of FIG. 6. The SMS-Gen 508 sends the received list identity to the memory means 509, in which is searched for an operation instruction, stored in advance and corresponding to the list identity. This operation instruction is returned to the SMS-Gen 508, which generates a short message corresponding to the operation instruction and sends it further to a short message handler 510, which is arranged in connection with the SMS-Gen 508. The SMS handler 510 sends the generated short message over the interface A 502 and the BSC 501 to the subscriber. The generated short message may contain an information of that the subscriber equipment to which the short message is transmitted shall be sent to regular maintenance, or it may contain a commercial information, for instance.

FIG. 6 shows the memory hierarchy of the memory means according to the invention with respective pairs of list identities and operations. Colors are used as examples of list identities: yellow, red, green and blue, each of them having a respective operation instruction programmed in advance. The operation instruction may, for instance, be an instruction to generate a desired short message and to send it to a desired subscriber.

The drawings and the associated specification are only intended to illustrate the concept of the invention. As to the details, the method of checking a subscriber equipment identity in a subscriber equipment identity register and a mobile telephone exchange according to the invention may vary within the scope of the claims. Though the invention has above been described mainly in connection with a GSM mobile telephone system, the invention may be used in connection with radio systems of other kinds, too.

I claim:

1. A method of checking a subscriber equipment identity in a subscriber Equipment Identity Register of a mobile telephone exchange, comprising:

providing the mobile telephone exchange with an interface block, for connecting the mobile telephone exchange to the subscriber Equipment Identity Register, which is arranged in connection with the mobile telephone exchange, which subscriber Equipment Identity Register comprises lists containing subscriber equipment identities, which lists have list identities, requesting by the mobile telephone exchange the subscriber for the subscriber equipment identity, sending by the subscriber the subscriber equipment identity to the mobile telephone exchange, sending by the mobile telephone exchange said subscriber equipment identity to the subscriber Equipment Identity Register, searching by the subscriber Equipment Identity Register for the subscriber equipment identity corresponding to said subscriber equipment identity in the lists, sending by the subscriber Equipment Identity Register the list identity of that list in which said subscriber equipment identity is found to the mobile telephone exchange, performing by the mobile telephone exchange a predetermined function corresponding to the list identity, maintaining a message delivery list of the equipment identities of the subscribers to which a predetermined short message shall be sent, detecting that the identity of the subscriber to be checked is in said message delivery list, sending the identity of said message delivery list from the equipment identity register to the mobile telephone exchange, and sending from the mobile telephone exchange to the subscriber said predetermined short message corresponding to the identity of said message delivery list.

2. Method as claimed in claim 1, said method comprising a step of maintaining a plurality of message delivery lists, each corresponding to a different short message to be sent.

3. A mobile telephone system, comprising:

a subscriber Equipment Identity Register, which comprises lists containing subscriber equipment identities, which lists have list identities and include a message delivery list having a list identity and maintaining the equipment identities of the subscribers to which a predetermined short message shall be sent, the subscriber Equipment Identity Register further containing a means for detecting that the identity of the subscriber to be checked is in said message delivery list, and a means for sending the identity of said message delivery list from the equipment identity register to the mobile telephone exchange, the system further comprising a mobile telephone exhange, responsive to the list identities from Equipment Identity Register for performing predetermined operations, said mobile telephone exhange further comprising:

a short message generator responsive to said identity of said message delivery list for generating said predetermined short message and for transmitting the generated short message to the subscriber.

* * * * *